May 29, 1951     S. BRANDT     2,555,181
CLOTHES RACK HOOK
Filed Oct. 7, 1948
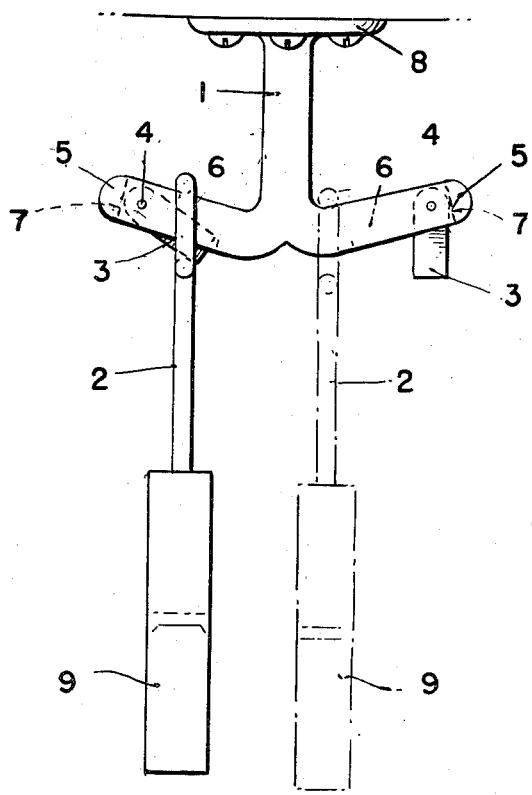
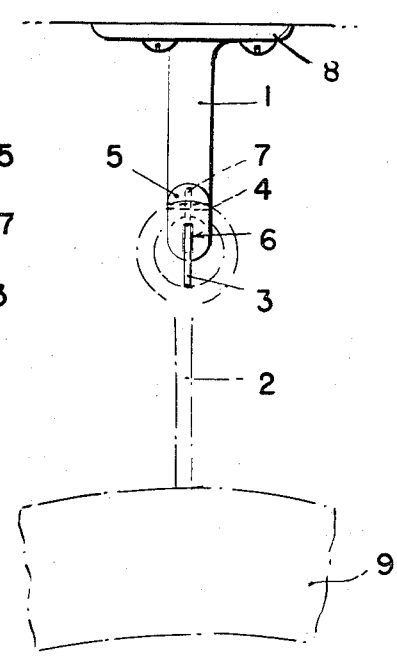
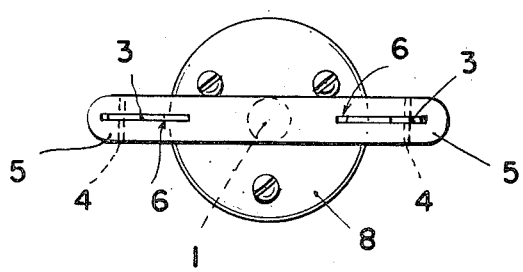
Inventor
SIXTEN BRANDT,
By E. F. Wenderoth
Attorney Patented May 29, 1951

2,555,181

UNITED STATES PATENT OFFICE 2,555,181

CLOTHES RACK HOOK

Sixten Brandt, Motala, Sweden

Application October 7, 1948, Serial No. 53,281
In Sweden April 13, 1948

2 Claims. (Cl. 248—215)

This invention relates to clothes-rack hooks and the like intended for use together with clothes-suspenders or the like having a closed mounting eye.

The object of the invention is to improve such clothes-rack hooks in a manner whereby, after a clothes-suspender of the type mentioned has been hung up on the hook, said suspender will not be inadvertently removed from its hook and drop to the floor as a result of the removing or manipulating of articles of dress suspended in the vicinity thereof, as is now often the case when using clothes-suspenders having conventional mounting hooks or eye screws which are hung up on clothes-rack hooks of the usual type.

For the purpose stated, according to the invention, there is proposed an improvement in clothes-rack hooks of the abovementioned kind which is characterized by the features that the arm of the hook cooperating with the eye of the clothes-suspender is disposed at such an angle to the stem of the hook that, when the hook is mounted in its position of use, said arm extends in a substantially horizontal direction, and that said arm is provided at its outer end portion with a blocking means, such as a pawl, said blocking means being adapted, when said eye is being passed onto said arm, to be moved into such a position as to pass through said eye, and to thereafter by its own gravity be moved into a position in which it is prevented by stop means, such as shoulder, from being moved into such a position as to permit the eye to be moved past the same in the opposite direction.

An example of construction according to the invention will now be described in conjunction with the accompanying drawing.

Fig. 1 is a side elevation view showing a double clothes-rack hook according to the invention together with a clothes-suspender.

Fig. 2 is an elevation showing the same in a plane at right angles to that of Fig. 1.

Fig. 3 is a bottom view of the same.

The clothes-hook according to the drawing comprises a stem 1 fixed to a mounting plate 8, and two oppositely directed suspension arms 5 which in the mounted position of the hook extend in a substantially horizontal direction. Each one of the suspension arms 5 is provided with an elongated slot 6 which opens in a downward direction. Near its outer end the slot 6 is traversed by a pivot pin 4 upon which a pawl 3 is mounted so as to be freely rotatable. The pawl 3 is able to be received to its full length in the slot 6. As the eye screw 2 of the clothes-suspender 9 is passed over the suspension arm 5 then, as shown to the left of Fig. 1, the pawl 3 is rocked into its slot 6, so that it can pass through the eye of the screw 2. After the eye has passed the pawl 3 the latter will be turned back by its own gravity into a vertical position, as shown to the right of Fig. 1. If the eye screw 2 is moved in the opposite direction it will act upon the lowered pawl 3 whereupon the latter is prevented by a shoulder 7 formed by the outer end of the slot 6 from being turned into such a position as to permit the eye 2 to be moved past the same. Accordingly, in order to move the eye screw 2 completely out of engagement with the arm 5, it will be necessary first to rock the pawl 3 into its slot 6 by hand whereafter the eye of the screw 2 can be moved over the same.

It will be understood that the invention is not limited to the embodiment described as it can be varied in several different ways within the scope of the invention. Thus, for example, the pawl 3 could be mounted outside the suspension arm 5 of the hook instead of being rockable into a slot in said arm, said shoulder in this case being preferably formed by the outer end of a recess in which the pawl is movable upon a transversely projecting pivot pin.

I claim:

1. A clothes-rack hook comprising means for mounting the same in an intended position of use, a stem fixed to said mounting means, an arm fixed to said stem and adapted to receive the eye of an eye screw of a clothes-suspender, said arm being disposed at such an angle to said hook stem that, when said hook is in its position of use, it extends in a substantially horizontal direction, said arm having a longitudinally extending recess in a side thereof, a gravity responsive pawl pivotally mounted in an end portion of said recess in said arm, and stop means in said recess formed by a boundary wall thereof limiting the movement of said pawl in one direction from a neutral position in which position it projects downward from said arm, whereby the passage of the eye of said screw is permitted in the direction towards said stem, and said passage is prevented in the opposite direction.

2. A clothes-rack hook according to claim 1 in which said recess is in the form of a slot extending longitudinally through said arm and opening in a downward direction to permit said gravity responsive pawl to project therefrom and to be received to its full length therein.

SIXTEN BRANDT.

REFERENCES CITED

The following references are of record in the file of this patent:

UNITED STATES PATENTS

| Number | Name | Date |
|---|---|---|
| 884,360 | Broga | Apr. 14, 1908 |
| 1,736,707 | Lake | Nov. 19, 1929 |

FOREIGN PATENTS

| Number | Country | Date |
|---|---|---|
| 102,657 | Sweden | Sept. 30, 1941 |